United States Patent
Liu et al.

(10) Patent No.: US 7,391,828 B2
(45) Date of Patent: Jun. 24, 2008

(54) SYMBOL BOUNDARY DETECTION DEVICE AND METHOD FOR USE IN OFDM SYSTEM

(75) Inventors: Der-Zheng Liu, Tainan (TW);
Song-Nien Tang, Kaohsiung (TW);
Tai-Cheng Liu, Kaohsiung (TW);
Kuang-Yu Yen, Taichung (TW)

(73) Assignee: Realtek Semiconductor Corp., Hsinchu (TW)

( * ) Notice: Subject to any disclaimer, the term of this patent is extended or adjusted under 35 U.S.C. 154(b) by 593 days.

(21) Appl. No.: 10/885,186

(22) Filed: Jul. 6, 2004

(65) Prior Publication Data
US 2005/0008088 A1    Jan. 13, 2005

(30) Foreign Application Priority Data
Jul. 8, 2003    (TW) .............................. 92118541 A

(51) Int. Cl.
*H04L 27/06*    (2006.01)

(52) U.S. Cl. ...................................................... 375/342

(58) Field of Classification Search ................ 375/260, 375/316, 340, 342, 343–344, 355, 365, 366; 370/503, 512, 509, 513
See application file for complete search history.

(56) References Cited

U.S. PATENT DOCUMENTS

| | | | |
|---|---|---|---|
| 5,285,474 A | 2/1994 | Chow et al. | |
| 6,373,861 B1 * | 4/2002 | Lee | 370/503 |
| 6,658,063 B1 * | 12/2003 | Mizoguchi et al. | 375/260 |
| 6,928,120 B1 | 8/2005 | Zhang | |
| 7,009,932 B2 | 3/2006 | Matheus et al. | |
| 7,058,002 B1 | 6/2006 | Kumagai et al. | |
| 7,123,670 B2 | 10/2006 | Gilbert et al. | |
| 7,139,320 B1 | 11/2006 | Singh et al. | |
| 7,158,542 B1 * | 1/2007 | Zeng et al. | 370/513 |
| 7,203,245 B1 * | 4/2007 | Murphy | 375/260 |
| 2003/0099312 A1 * | 5/2003 | Gummadi et al. | 375/343 |
| 2003/0108127 A1 | 6/2003 | Eilts et al. | |
| 2003/0142766 A1 * | 7/2003 | Golanbari et al. | 375/343 |
| 2004/0170237 A1 * | 9/2004 | Chadha et al. | 375/343 |
| 2004/0190560 A1 * | 9/2004 | Maltsev et al. | 370/503 |

FOREIGN PATENT DOCUMENTS

JP    11308821    11/1999

(Continued)

OTHER PUBLICATIONS

"Application of the ADC1210 CMOS A/D Converter" National Semiconductor Application Note 245, Apr. 1986.

(Continued)

*Primary Examiner*—Khanh C. Tran
(74) *Attorney, Agent, or Firm*—Thomas, Kayden, Horstemeyer & Risley

(57) ABSTRACT

A symbol boundary detection device and a method thereof for use in a receiver of a multi-channel communication system. The device utilizes a threshold to make an auxiliary judgement so as to select a proper symbol boundary reference point within an early range. The threshold may be flexibly set in response to different characteristics of the systems. In addition, a pilot symbol guard interval matched filter is further utilized to determine whether a pilot symbol guard interval is received.

35 Claims, 11 Drawing Sheets

FOREIGN PATENT DOCUMENTS

JP        2001053712        2/2001

OTHER PUBLICATIONS

"A Discrete Multitone Transceiver System for HDSL Applications" Chow, et al.; IEEE J. on Sel Areas in Comm., vol. 9, No. 6, pp. 895-908, Aug. 1991.

"Impulse Response Shortening for Discrete Multitone Transceivers" Melsa et al.; IEEE Trans on Comm., vol. 44, No. 12, oo. 1662-1672, Dec. 1996.

"Efficiently Computer Reduced-Parameter Input-Aided MMSE Equalizers for ML Detection: A Unified Approach" N. Al-Dhahir et al.; IEEE Trans. on Info. Theory, vol. 42, pp. 903-915, May 1996.

"Optimum Finite-Length Equalization for Multicarrier Transceivers" N. Al-Dhahir et al.; IEEE Trans on Comm., vol. 44, pp. 56-53, Jan. 1996.

"Maximizing the Channel Capacity of Multicarrier Transmission by Suitable Adaptation of the Time-Domain Equalizer" Henkel et al.; IEEE Trans. on Comm., vol. 48, No. 12, Dec. 2000.

"Equalizer Traiing Algorithms for Multicarrier Modulation System" Chow et al.; ICC, pp. 761-765, May 1993.

"Per Tone Equalization for DMT-Based Systems" Katleen et al.; IEEE Trans. on Comm., vol. 49, No. 1, Jan. 2001.

"Equalization for Discrete Multitone Transceivers to Maximize Bit Rate" Arslan et al.; IEEE Trans. on Signal Processing.

"A Pilot-Based Frequency Offset Tracking Scheme in OFDM Systems" Du et al.; 2001 International Conferences on Info-Tech and Info-Net, vol. 2, pp. 566-571, Beijing China, Oct. 29, 2001 - Nov. 1, 2001.

"An Improved Automatic Frequency Correction Scheme for Discontinuous Plot Mobile Communication System" Zhang et al.; IEEE 2001 Spring Vehicular Technology Conference, vol. 3, pp. 1708-1712, Rhodes, Greece, May 6-9 2001.

"ML Estimation of Carrier Frequency Offset for Multicarrier Signals in Rayleigh Fading Channels" Choi et al.; IEEE Transactions on Vehicular Technology, vol. 50, pp. 644-655, Mar. 2001.

"Frequency Offset Estimation in an OFDM System" Chen et al.; 2001 IEEE Third Workshop on Signal Processing Advances in Wireless Communications (SPAWC '01), pp. 150-153. Taiwan, Mar. 20-23, 2001.

"Frequency Offset Correction for Coherent OFDM in Wireless Systems" Garcia et al.; IEEE Transactions on Consumer Electronics, vol. 47, pp. 187-193, Feb. 2001.

"Frequency Offset Tracking in OFDM Based on Multicarrier PLL" Dacca et al.; 21st Century Military Communications Conference, vol. 2, pp. 912-916, Oct. 22-25, 2000.

"Multi-Carrier Modulation for Data Transmission: An Ideal Whose Time Has Come" Bingham; IEEE Communications Magazine, pp. 5-14, May 1990.

"Synchronization with DMT Modulation" Pollet et al.; IEEE Communications Magazine, Apr. 1999.

"The BER Performance of OFDM Systems Using Non-Synchronize Sampling" Pollet et al.; Proc. Globecom '94, pp. 253-257, San Francisco, CA, Dec. 27-29, 1994.

"Signals, Systems, and Transforms" Jackson; Addison-Wesley Publishing Company, Inc., pp. 410, 1991.

* cited by examiner

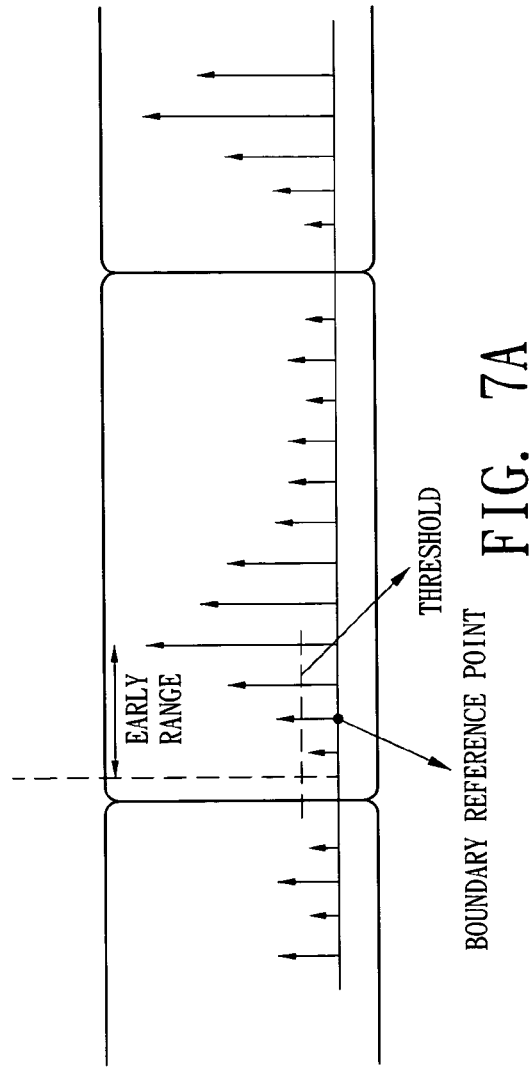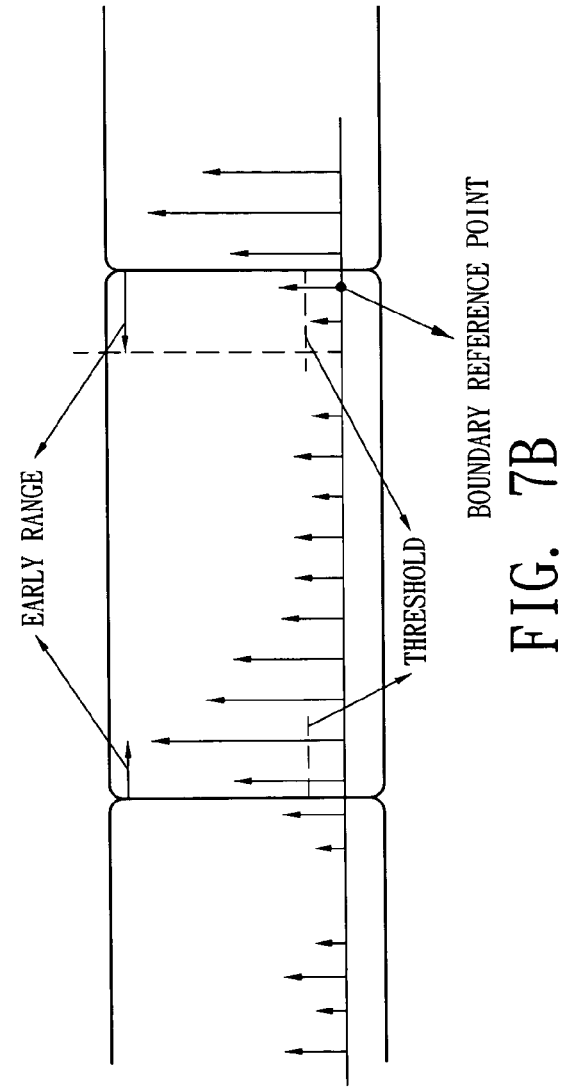

SYMBOL BOUNDARY DETECTION DEVICE AND METHOD FOR USE IN OFDM SYSTEM

This application claims the benefit of Taiwan application Serial No. 092118541, filed on Jul. 8, 2003, the subject matter of which is incorporated herein by reference.

BACKGROUND OF THE INVENTION

1. Field of the Invention

The invention relates in general to an OFDM (orthogonal frequency division multiplexing) communication system, and more particularly to symbol boundary detection device and method for use in an OFDM system.

2. Description of the Related Art

Recently, a multi-carrier (or multi-channel, multi-tone) communication technology has been widely used in data transmission, such as the OFDM (orthogonal frequency division multiplexing) technology for use in the IEEE 802.11a/g WLAN (wireless local area network). FIG. 1 is a block diagram showing a typical OFDM system. The OFDM system 100 respectively puts the to-be-transmitted data into N sub-channels in the frequency domain through a signal mapping device 101 in a transmitter. Then, an inverse fast Fourier transform (IFFT) device 102 transforms the to-be-transmitted data into a time-domain signal, to which a guard interval (GI) is added. Next, the time-domain signal with the guard interval passes through a parallel-to-serial converter (P/S) 104 and a DAC (digital-to-analog converter) 105, and is then transmitted in the channel 106. An ADC (analog-to-digital converter) 107 of the receiver samples the signal and removes the GI therefrom. Then, the signal passes through the serial-to-parallel converter (S/P) 110 and is fed to the fast Fourier transform (FFT) device 111, which transforms the signal back to the frequency domain signal. Then, channel compensations are respectively performed in the sub-channels, and finally a signal demapping device 113 demaps to signal into the originally transmitted data.

An output value of a set of N-point IFFT is referred to as a symbol. Because the channel impulse response (CIR) is not ideal in practical, a symbol passing through the channel 106 influences the subsequent symbol receiving operation in the receiver, thereby causing inter-symbol interference (ISI). In order to avoid this problem, a guard interval (GI) is added between the symbols. In general, the GI is added in a cyclic prefix (CP) manner. That is, the post-stage signal of the output symbol is duplicated to the front stage to serve as the GI. Consequently, it is possible to prevent the ISI from occurring and the N sub-channels from interfering with one another or each other when the CIR length does not exceed the GI. The part of signal processing is accomplished by adding a guard interval circuit 103 and removing a guard interval circuit 109 in FIG. 1.

However, the receiver has to determine the correct start position (i.e., the symbol boundary) of the time domain sampling signal inputted to the FFT device 111, that is, the proper time to perform FFT on the receiving sampling signal, before the GI is removed so as to avoid the ISI effectively. Thus, it is an important subject to perform a proper symbol boundary detection.

In the OFDM system 100, a known short preamble with the time domain periodicity for the synchronous processing of the time domain is firstly transferred in the packet or code frame. Then, known pilot symbols (or referred to as a long preamble) with the frequency domain signal for the channel estimation in the frequency domain are transferred so that channel compensation in the frequency domain is performed in the subsequent data symbols. A guard interval (referred to as GI2) is added before the long preamble time-domain signal, and the guard interval (referred to as GI) is also added before each data symbol in order to avoid the ISI. FIG. 2 shows the code frame architecture of a typical OFDM signal. As shown in FIG. 2, the short preamble is typically composed of some time-domain cyclic symbols with the auto-correlation property, and the long preamble symbols and subsequent data symbols are respectively added thereafter.

In the conventional boundary symbol detecting method, the receiver usually determines the proper start points of the long preamble symbols and the subsequent data symbols in order to remove the GI and to serve as the start basis for the subsequent input FFT according to the cyclic and auto-correlation properties of the short preamble. This method may be typically viewed as two parts.

First, the sampling signal of the received code frame is sent to the sliding delay correlator, and its output result is observed. The operation method of this sliding delay correlator is as follows:

$$c_k = \sum_{n=0}^{N-1} r_{k-n} \cdot r^*_{k-n-N}. \quad (1-1)$$

This operation correlates the sampling interval of the N points with the sampling interval of the previous N points, wherein the sampling interval of N points is sliding updated when the new sampling points are received. In Equation (1-1), $r_k$ denotes the k-th sampling value of the received code frame, N denotes the sampling number within one period of the short preamble, and $c_k$ is the k-th output value of the sliding delay correlator. According to the operation property of the sliding delay correlator, when the received signal is the cyclic signal, the absolute value of its output reaches a maximum. Accordingly, the absolute value of the output of the sliding delay correlator reaches the maximum when the short preamble is received, and reaches a relatively smaller value at other time. Thus, whether or not the short preamble has been received may be detected by comparing the absolute output value to a threshold. When the absolute output value ascends, from the relatively smaller value, to a value greater than this threshold, it means that the code frame has been detected (i.e., the receiving of the short preamble is started). Then, when the absolute output value descends to a value smaller than this threshold, it means that the guard interval of the long preamble symbols has been detected (i.e., the receiving of the short preamble is ended). FIG. 3 shows a schematic illustration of this mechanism.

Secondly, the sampling signal of the received code frame is transferred to a short preamble matched filter. The matched filter performs a plurality of linearly auto-regressive operations with respect to the sampling signal using the known short preamble as the coefficients. The operation method thereof is as follows:

$$z_k = \sum_{n=0}^{N-1} r_{k-n} \cdot p^*_n, \quad (1-2)$$

wherein $r_k$ is the value of the k-th sampling points of the received code frame, $p_n$ is the known short preamble, N is the sampling number within one period of the short preamble, and $z_k$ is the k-th output result of the matched filter. Because the short preamble typically has some auto-correlation property, the output of the matched filter presents the estimated result of the time domain channel impulse response (CIR). In addition, because of the periodicity of the short preamble itself, if the output result of the matched filter is observed using a window having the length of N points, the estimated value of the CIR also presents in the window periodically. FIG. 4 shows a schematic illustration of this mechanism.

In the conventional method, there are two drawbacks. First, when determining the symbol boundary reference point, the maximum peak value in the observed window is detected, and then an early range is set forward according to this maximum peak value in order to cover the pre-cursor response of the CIR. Herein, the early range correlates with the boundary of the observed window. It is assumed that the start point of the early range is x sampling points in front of the maximum peak value, and the maximum peak value is distant from the start boundary of the window by y sampling points. If x<=y, then the start point of the early range is (y-x) point after the start boundary of the window, wherein the early range is from the start point, i.e. the (y-x)th point of the window, to the maximum peak value, i.e. the yth point of the window, as shown in FIG. 5A. If x>y, then the start point of the early range is (x-y) points before the end boundary of the window, wherein the early range ranges from the start point to the end boundary of the window as well as from the start boundary of the window to the maximum peak value, as shown in FIG. 5B. In the early range, the receiver further selects a position away from the maximum peak value by the fixed number of sampling points to serve as the symbol boundary reference point. This fixed method, however, lacks of flexibility, and misjudgment of the reference point will be made when the pre-cursor response is longer or has many relatively high peak values, thereby influencing the efficiency of the receiver.

Secondly, in the channel environment of the larger delay spread, the appearance of the guard interval of the long preamble symbols is often incorrectly estimated owing to the delay, and thus the timing for the long preamble symbols and the subsequent data symbols to enter the FFT device 111 is determined incorrectly.

SUMMARY OF THE INVENTION

It is therefore one of the objects of the invention to provide a symbol boundary detection device and a method thereof. The boundary detection device utilizes a threshold to make an auxiliary judgement so as to select a proper symbol boundary reference point within an early range. The threshold may be flexibly set in response to different systems. The boundary detection device includes a matched filter, a boundary detector, a detection unit, and a timing controller in order to determine the start point of the symbol of the packet.

In addition, if the packet includes a pilot symbol and its guard interval, the boundary detection device further utilizes a pilot symbol guard interval matched filter for generating different outputs when the preamble and the guard interval of the pilot symbol are received. Hence, a determination as to whether the guard interval of the pilot symbol has been received can be made.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIGS. 7A and 7B are schematic illustrations showing that a symbol boundary reference point is selected in the early range of the embodiment of the invention.

DETAILED DESCRIPTION OF THE INVENTION

Figure 1:
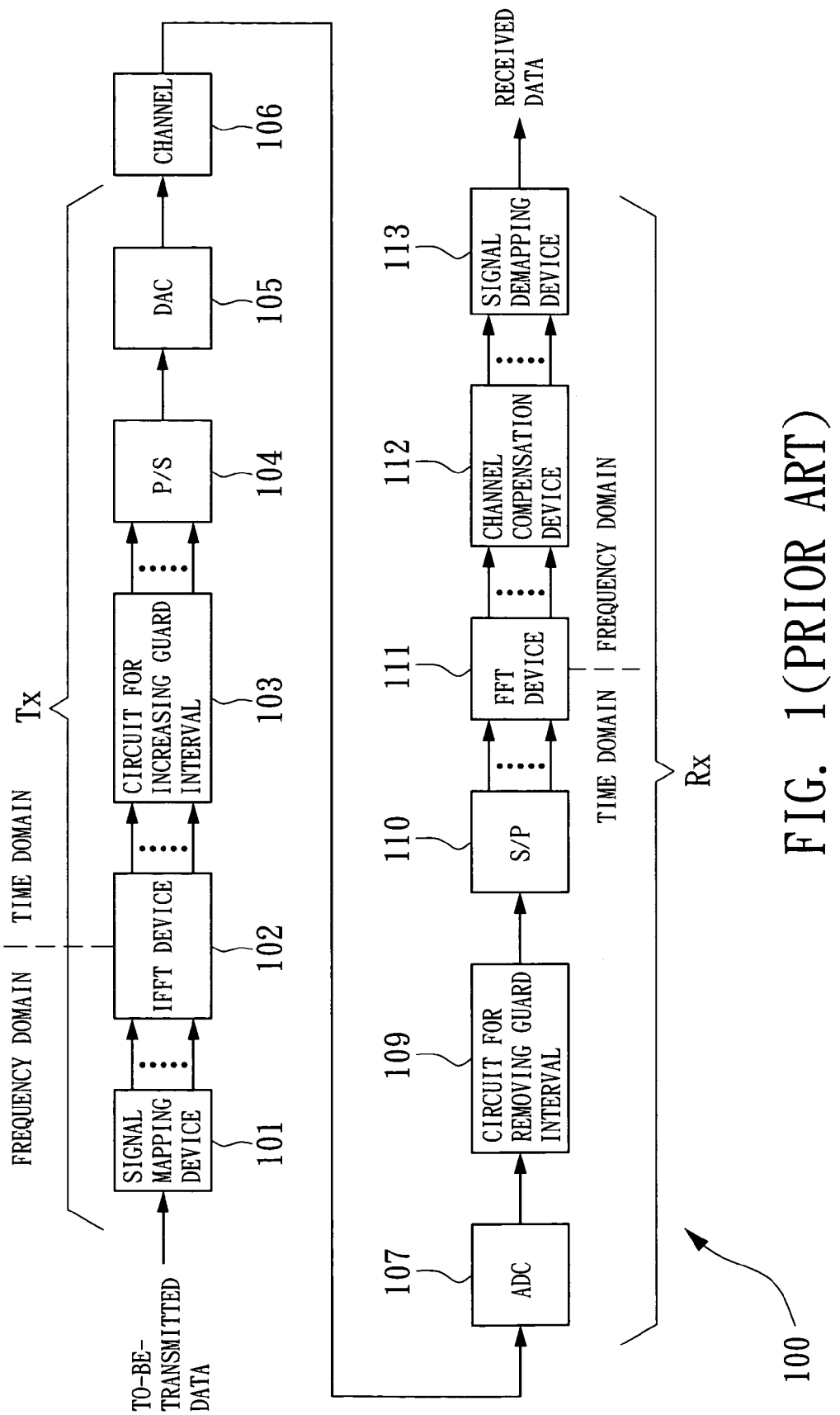
FIG. 1 (Prior Art) is a block diagram showing a typical OFDM (orthogonal frequency division multiplexing) system.
Figure 2:
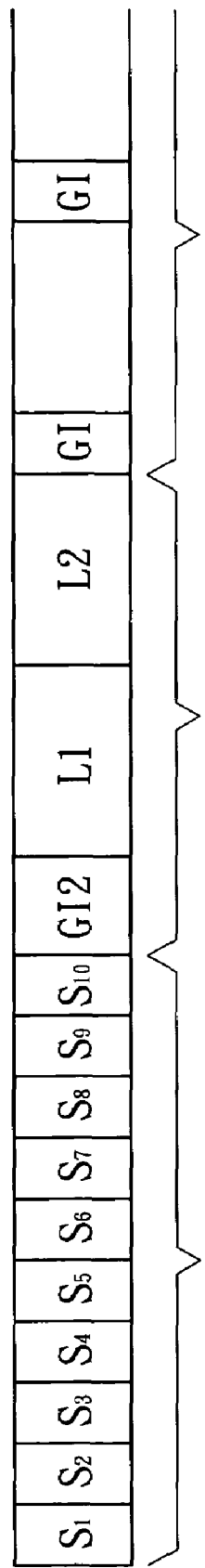
FIG. 2 (Prior Art) is a schematic illustration showing a code frame architecture of a typical OFDM signal.
Figure 3:
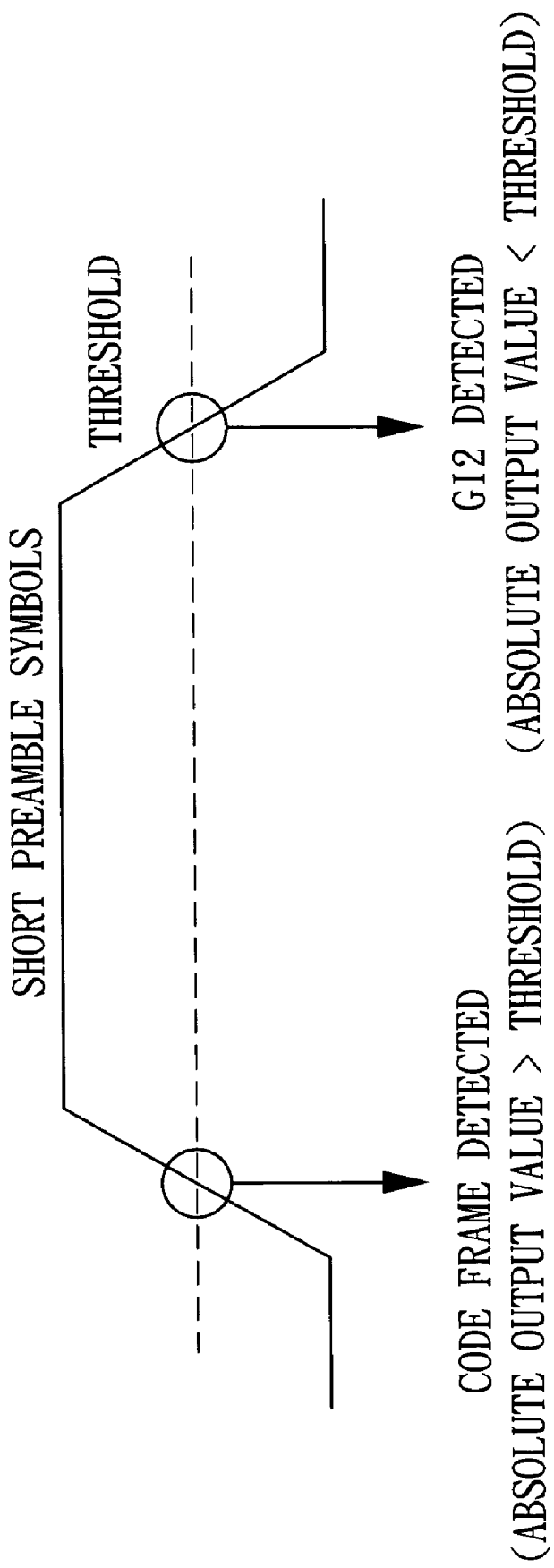
FIG. 3 (Prior Art) is a schematic illustration showing that a sliding delay correlator is utilized to detect the code frame and the pilot symbol guard interval in the prior art.
Figure 4:
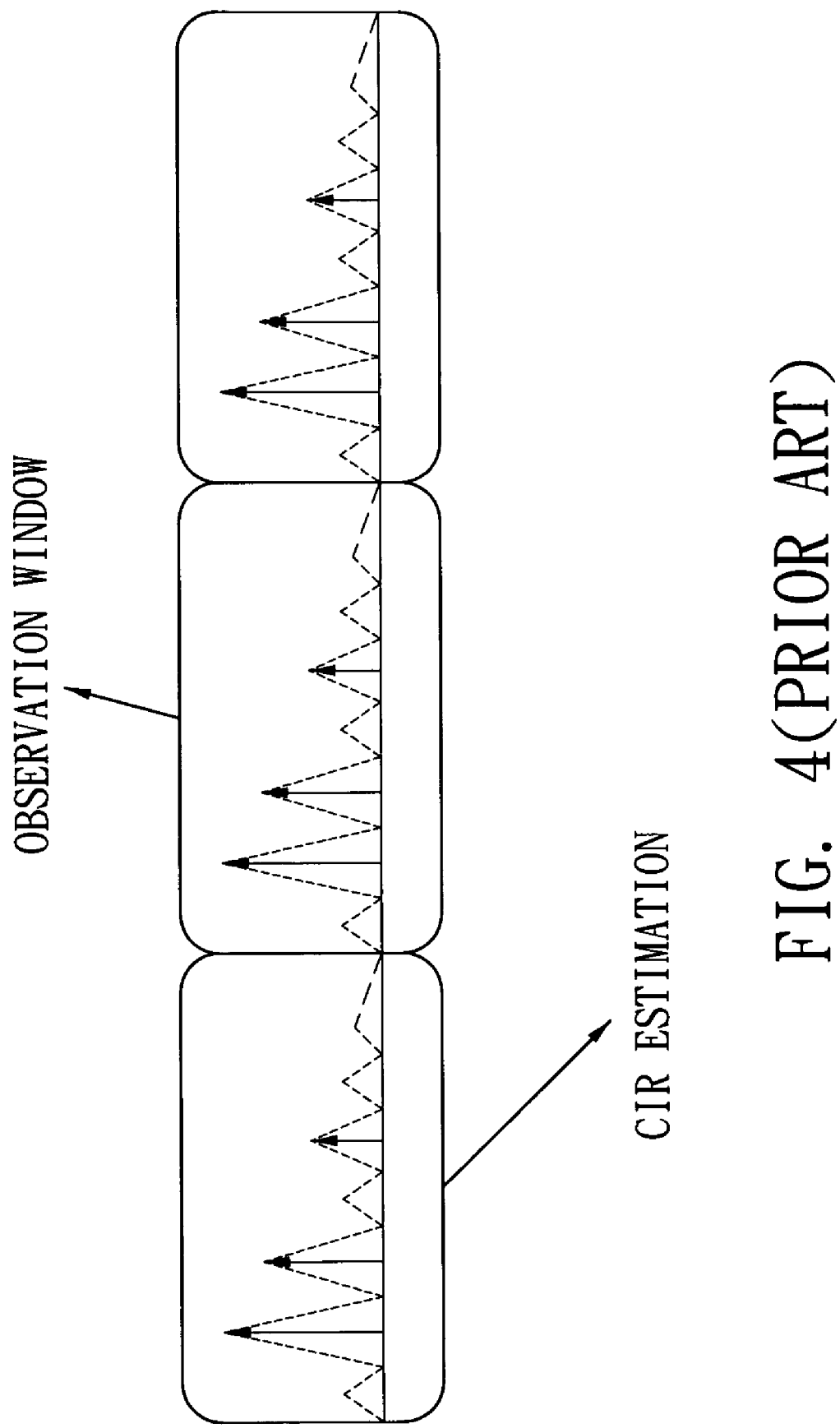
FIG. 4 (Prior Art) is a schematic illustration showing that a short preamble matched filter is utilized to observe an estimated value of CIR in the prior art.
Figure 5A:
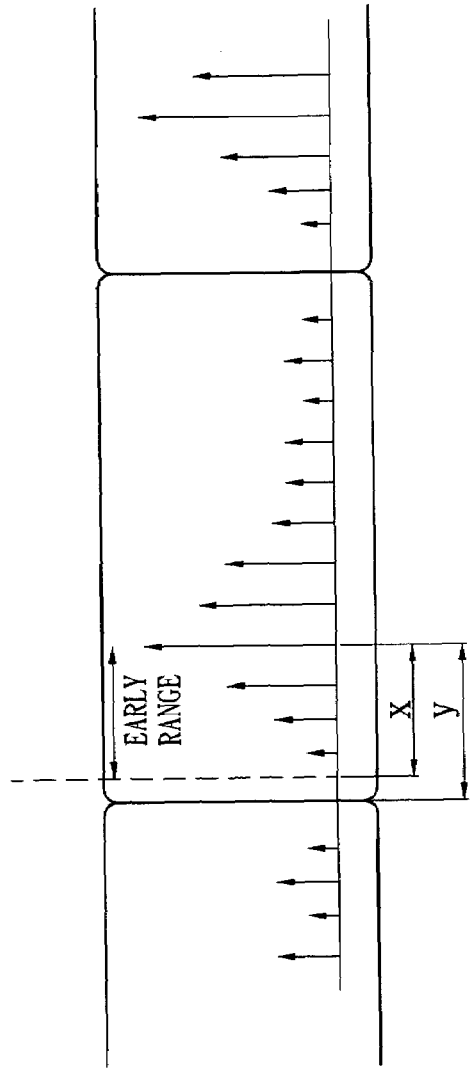
FIGS. 5A and 5B (Prior Art) are schematic illustrations showing that an early range start point is determined in an observation window.
Figure 5B:
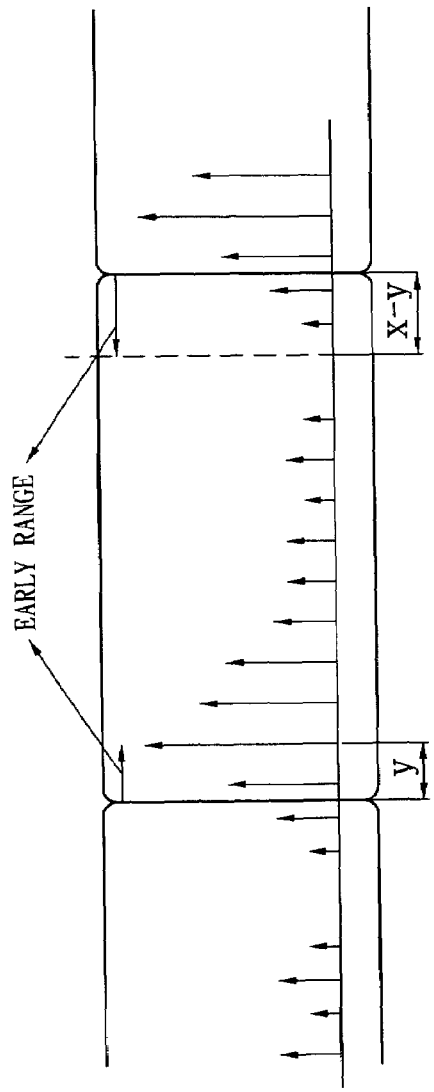
Figure 6:
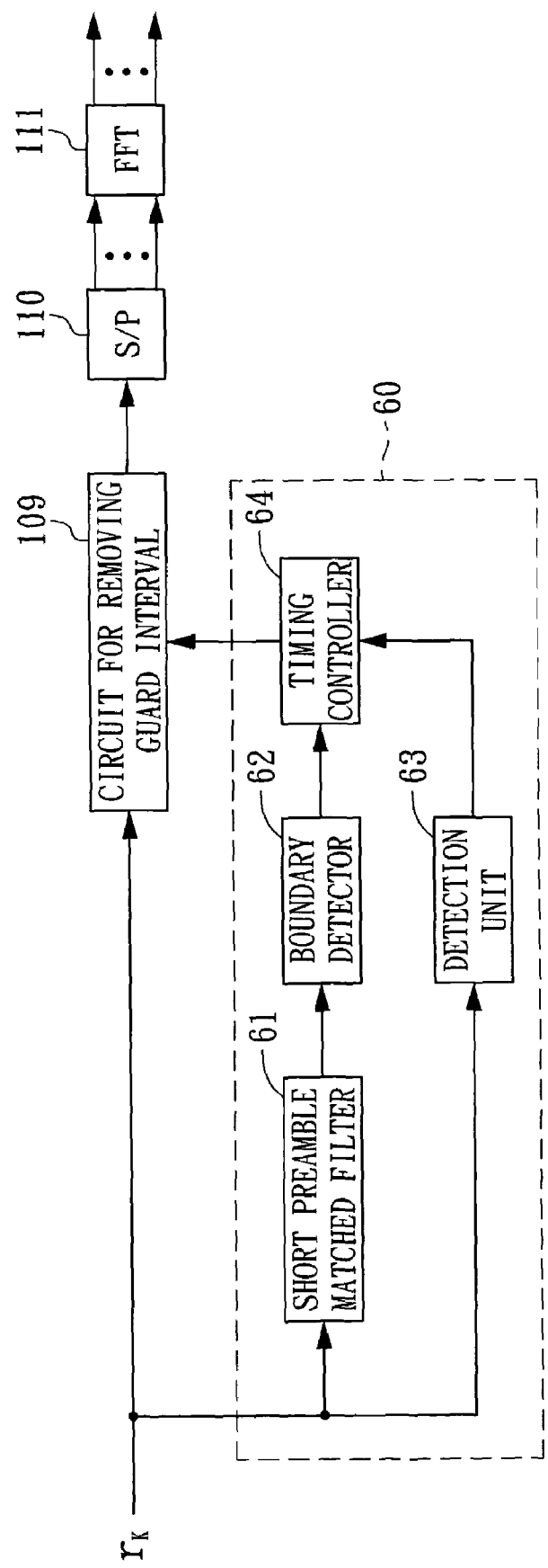
FIG. 6 is a block diagram showing a symbol boundary inspection device of the embodiment of the invention.

The implementation of this invention will be described with reference to the OFDM system 100 of FIG. 1. As shown in FIG. 2, the received/transmitted code frame of the OFDM system 100 sequentially has a periodical short preamble, a long preamble including a pilot symbol and its guard interval GI2, and a plurality of data symbols and their guard intervals GI. Herein, it is also assumed that the sampling number is N within one period of the short preamble. FIG. 6 is a block diagram showing a symbol boundary detection device 60 proposed in conjunction with this code frame architecture of the embodiment of the invention. Referring to FIG. 6, the boundary detection device 60 includes a short preamble matched filter 61 for receiving a sampling signal $r_k$ of the code frame and performs the operation of Equation (1-2). When the short preamble is received, the matched filter 61 outputs an estimated value of the channel impulse response (CIR) of the OFDM system 100.

The boundary detection device 60 also includes a boundary detector 62, which is coupled to the short preamble matched filter 61 to determine a maximum peak value outputted from the matched filter 61, to determine the first threshold according to this maximum peak value as well as the early range according to the position of the sampling point with the maximum peak value, wherein the position of sampling point with the maximum peak value is the end point of the early range and then to select the position of the sampling point, which is nearest to the start point of early range and the value of the sampling point is greater than the first threshold in the early range, as the symbol boundary reference point. In selecting the maximum peak value, the boundary detector 62 determines the output value of the matched filter 61 with a window having a length of N points, and calculates the average of the N points in many different windows. Taking a window having a length of 16 points as an example, the window sequentially observes the values of every 16 successive sampling signals in the short preamble, and then derives the maximum peak value according to the maximum value of the 16 successive sampling points. For example, the window is firstly used to observe a first sample observation set, i.e., the values of the first to sixteenth sampling signals, in the short preamble. Thereafter, the window is used to observe a second sample observation set, i.e., the values of the 17th to 32nd sampling signals, is observed. Then, the averages of two corresponding sampling signals, such as the average of the first and 17th sampling signals, the average of the second and 18th sampling signals, . . . , the average of the 16th to 32nd sampling signals, in the two sample observation sets are calculated. After all the averages are obtained, a maximum among them is selected as the maximum peak value. The average may be any one of the various mathematical averages, such as the arithmetical average, the geometric average, the exponential average, or the like.

The start point of the early range may be determined according to the position of the sampling point with the maximum peak value in the window and the previously predetermined length of the early range. For example, if it is assumed that the average of the values of the 10th and 26th sampling signals is the maximum peak value, then the value of the 10th sampling point in the window is the maximum peak value. If it is assumed that the length of the early range is 8, then the second (10-8) sampling point in the window is the start point of the early range, and the early range ranges from the 2nd to 10th sampling points in the window, which is the condition of FIG. 7A when the early range does not exceed the start boundary of the window. As for another condition, if it is assumed that the average of the value of the 2nd to 18th sampling signals is the maximum peak value, then the 2nd sampling point in the window has the maximum peak value. If it is assumed that the length of the early range is 8, then the start point of the early range is the position of the 11th sampling point (counted back by (8-2) sampling points from the end boundary (the $16^{th}$ sampling point) of the window), and the early range ranges from the 11th to 16th sampling points in the window as well as from the first to second sampling points, which is the condition of FIG. 7B when the early range exceeds the window's start boundary.

In addition, after the maximum peak value is determined, the boundary detector 62 properly multiplies the maximum peak value by a weighting coefficient to obtain a weighting value as the first threshold in response to the characteristics of the specific communication system. As the weighting coefficient is too large, the first threshold becomes higher, which tends to make the selected symbol boundary point lag behind that when the coefficient is normal, and thus to cause the actually processed symbol to encounter the interference of the next symbol, thereby causing the ISI. As the weighting coefficient is too small, the first threshold becomes lower, which tends to make the selected symbol boundary point advance that when the coefficient is normal, and to cause the actual symbol boundary point to encounter the interference of the previous symbol in the channel with the larger delay spread, thereby causing the serious ISI. The method for determining the weighting coefficient of the maximum peak value is determined by the channel characteristic of the communication system that is determined by actually simulation. After the first threshold is determined, the boundary detector 62 selects the position of the sampling signal, which is nearest to the start point of the early range and has a value greater than the first threshold in the early range, as the symbol boundary reference point. The mechanism for selecting the symbol boundary reference point implemented by the boundary detector 62 may be represented by the schematic illustrations of FIGS. 7A and 7B.

Figure 8:
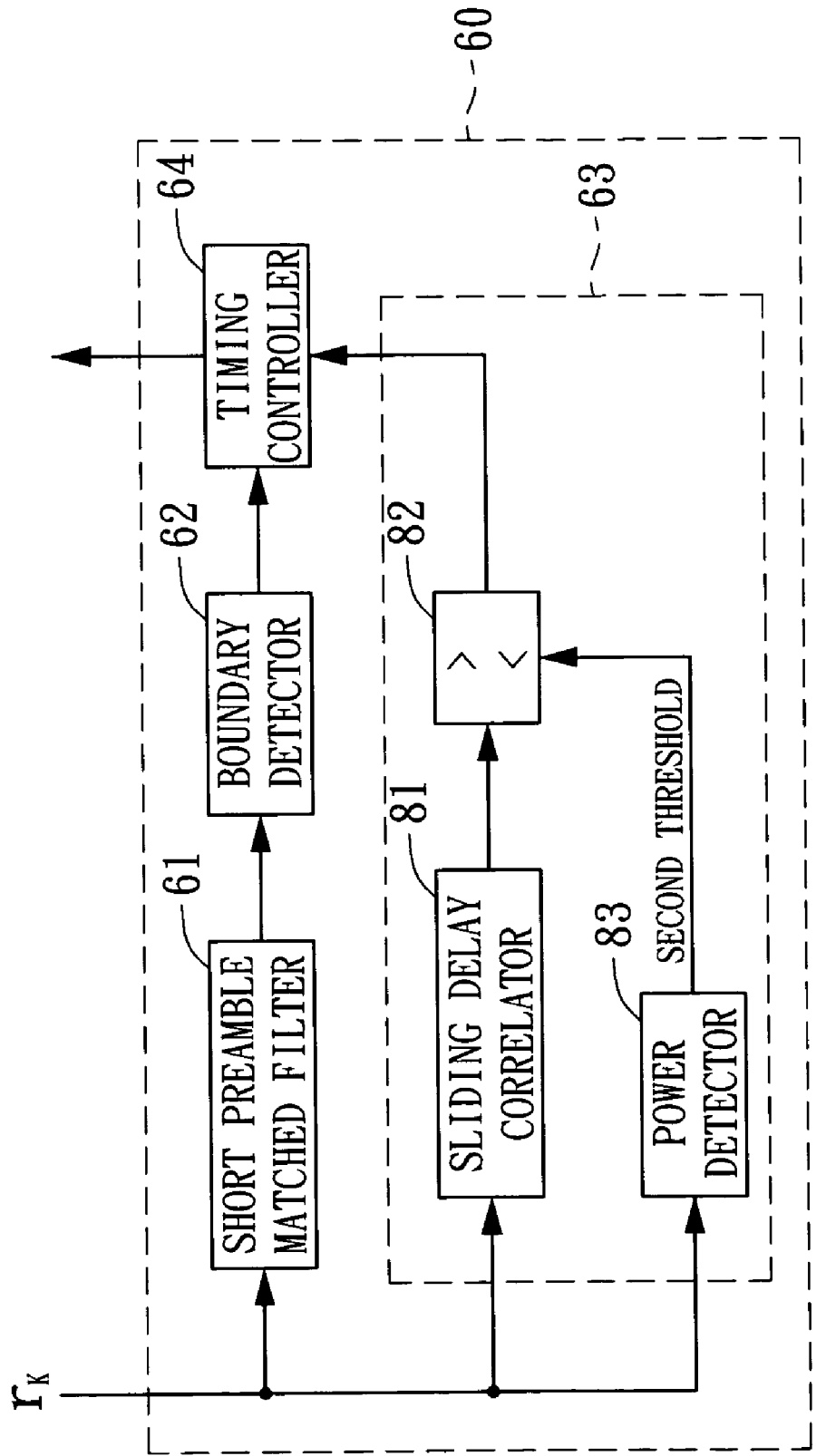
FIG. 8 is a block diagram showing an embodiment of the detection unit of FIG. 6.

The boundary detection device 60 also includes a detection unit 63 for detecting the receiving operation of the guard interval (GI2) of the pilot symbol in the receiver. FIG. 8 is a block diagram showing an embodiment of the detection unit 63 of FIG. 6. In the embodiment of FIG. 8, the detection unit 63 includes a sliding delay correlator 81 for correlating N points of sampling interval in the sampling signal $r_k$ of the received code frame with another sampling interval after the signal is delayed by N points according to Equation (1-1). The detection unit 63 further includes a comparator 82, which is coupled to the sliding delay correlator 81 and the timing controller 64, for comparing an output value of the sliding delay correlator 81 to a second threshold. When the output value is smaller than the second threshold, it is determined that the receiver has received the GI2. The detection unit 63 further includes a power detector 83 for calculating a reference power as the second threshold according to the sampling signal $r_k$ of the received code frame. In this way, the second threshold can be adjusted dynamically in order to avoid incorrect determination by the comparator 82 due to the instability of the sampling signal $r_k$ caused by, for example, the noise interference.

Figure 9:
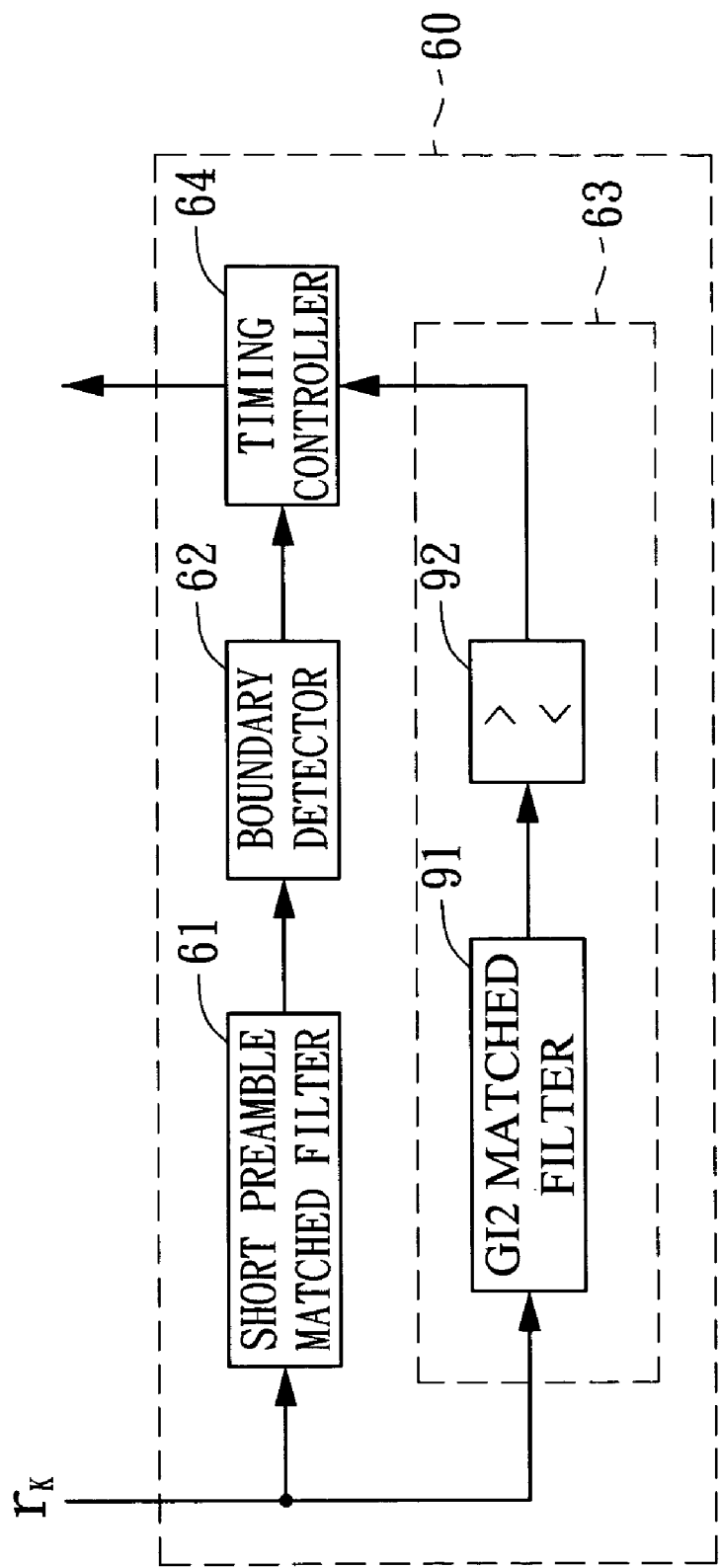
FIG. 9 is a block diagram showing another embodiment of the detection unit of FIG. 6.
Figure 10:
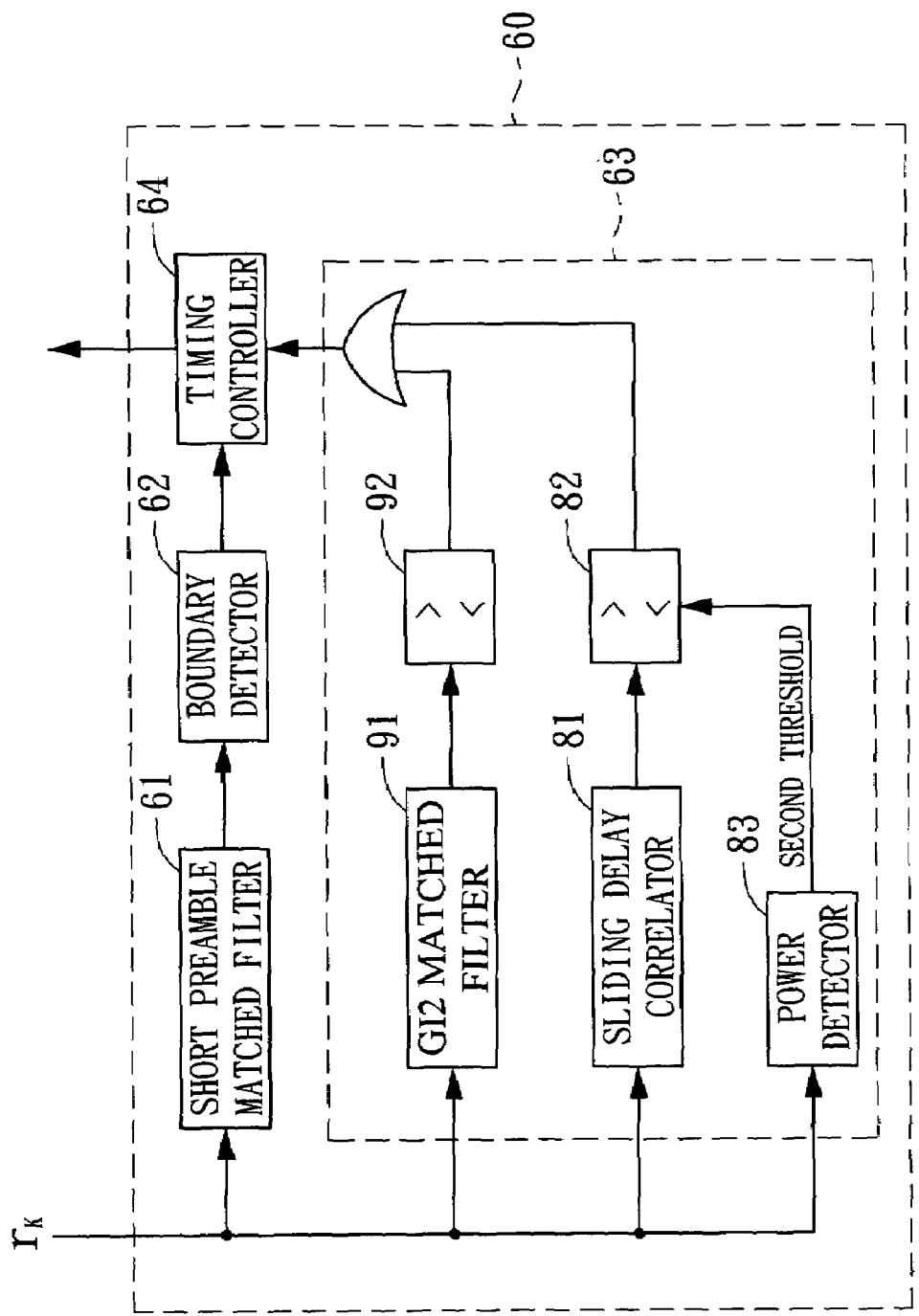
FIG. 10 is a block diagram showing still another embodiment of the detection unit of FIG. 6.

FIG. 9 is a block diagram showing another embodiment of the embodiment of FIG. 6. In the embodiment of FIG. 9, the detection unit 63 includes a GI2 matched filter 91 for receiving the sampling signal $r_k$ of the code frame. Because the GI2 has no particular cross-correlation with the short preamble and the GI2 itself also has some extent of auto-correlation property, the GI2 matched filter 91 generates the output with noise during the period of receiving the short preamble, and generates the estimated value of CIR of the OFDM system 100 when the GI2 is received. The detection unit 63 further includes a second comparator 92, which is coupled to the boundary detector 62, the GI2 matched filter 91 and the timing controller 64. The second comparator 92 determines a third threshold according to the maximum peak value provided by the boundary detector 62, and compares the output value of the GI2 matched filter 91 to a third threshold. When the output value is greater than the third threshold, it is determined that the receiver has received the GI2. In still another embodiment, it is possible to combine the embodiments of the detection unit 63 of FIGS. 8 and 9 with an OR gate, as shown in FIG. 10.

The boundary detection device 60 also includes a timing controller 64, which is coupled to the boundary detector 62 and the detection unit 63, for determining the start point of the long preamble symbol and the subsequent data symbols according to the symbol boundary reference point selected by the boundary detector 62 and the detection result of the detection unit 63. In the embodiments of FIGS. 8 to 10, when the detection unit 63 determines that the receiver has received the GI2 in some observation window, the timing controller 64 finds the symbol boundary reference point in some subsequent window as the start point of the long preamble symbol according to the length of GI2 (usually integral times of N), and the start points of the data symbols also may be determined accordingly. After the start points of the symbols have been determined, a circuit 109 for removing the guard interval is controlled to remove the guard interval of the long preamble symbols and between the subsequent data symbols, and then the long preamble and the subsequent data symbols are inputted to the FFT device 111.

Figure 11:
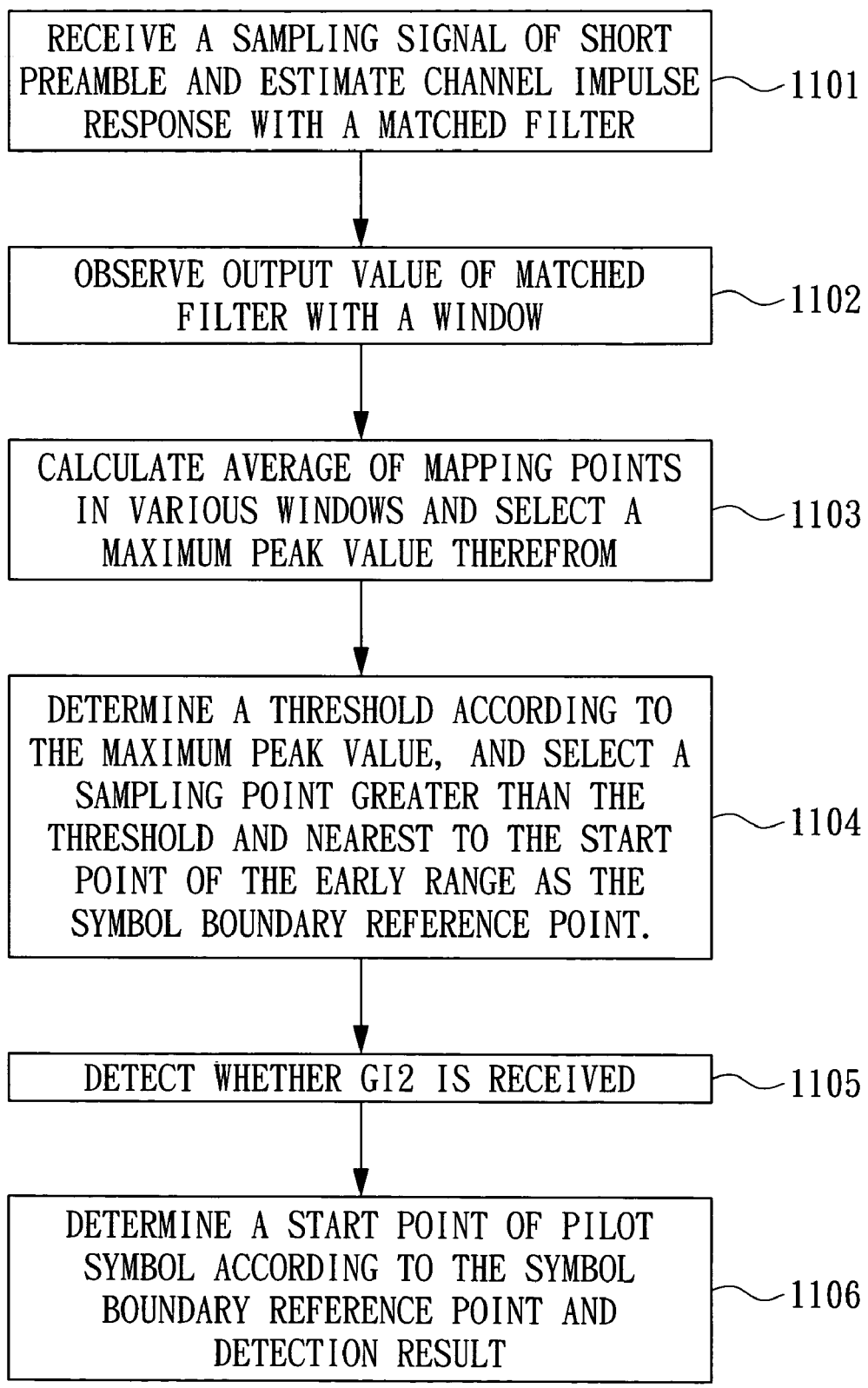
FIG. 11 is a flow chart showing the operations of the symbol boundary detection method of the embodiment of the invention.

Next, the description will be made as to how to utilize the symbol boundary detection device 60 to implement the symbol boundary detection method of the invention. FIG. 11 is a flow chart showing the operations of the symbol boundary detection method of the invention. Referring to FIG. 11, the detection method includes the following steps.

In step 1101, the short preamble matched filter 61 is utilized to receive the short preamble and thus to estimate the CIR of the OFDM system 100.

In step 1102, the boundary detector 62 utilizes a window with a length of N points to observe the output value of the matched filter 61.

In step 1103, the boundary detector 62 calculates the average of the corresponding points in various windows and selects a maximum peak value therefrom.

In step 1104, the boundary detector 62 determines a threshold according to the maximum peak value, determines an early range according to a relative position of the maximum peak value, and selects a sampling point greater than this threshold and nearest to the start point of the early range in the window as the symbol boundary reference point.

In step 1105, the detection unit 63 detects whether the receiver has received the GI2.

In step 1106, the timing controller 64 determines the start point of the long preamble symbol according to the symbol boundary reference point and the detection result of step 1105.

In one embodiment, step 1105 includes: (a1) performing a correlation operation of Equation (1-1) according to the sampling interval of N points in the sampling signal of the received code frame and another sampling interval of the previous N points; (a2) calculating the reference power as the second threshold according to the sampling signal of the received code frame; and (a3) comparing the result of the correlation operation to the second threshold in order to determine whether the receiver has received the GI2.

In another embodiment, step 1105 includes: (a1) utilizing a GI2 matched filter to receive the sampling signal of GI2 and output an estimated value of CIR of the OFDM system 100; (a2) determining a third threshold according to the maximum peak value selected in step 1103; and (a3) comparing the output value of the GI2 matched filter to the third threshold so as to determine whether the receiver has received the GI2.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A symbol boundary detection device for use in a receiver of a multi-channel communication system, wherein the receiver receives a packet having a plurality of signals which are divided into a first preamble, a second preamble and at least one symbol, the symbol boundary detection device comprising:
   a first preamble matched filter for outputting a first estimated signal corresponding to a CIR (channel impulse response) of the multi-channel communication system according to the first preamble;
   a boundary detector, which is coupled to the first preamble matched filter, for determining a symbol boundary reference point according to the first estimated signal;
   a detection unit for outputting a detection signal when detecting the receiving of the second preamble; and
   a timing controller, which is coupled to the boundary detector and the detection unit, for determining a start point of the at least one symbol according to the symbol boundary reference point and the detection signal.

2. The device according to claim 1, wherein the first estimated signal is generated according to the auto-correlation property of the first preamble.

3. The device according to claim 1, wherein the first estimated signal comprises a plurality of sampling points.

4. The device according to claim 3, wherein the boundary detector further includes:
   a observation window circuit to determine a maximum peak value of the first estimated signal according to the sampling points;
   a threshold determining circuit to determine a threshold according to a maximum peak value and a weighting coefficient;
   a early range determining circuit to determine the early range according to the position of the sampling point corresponds to the maximum peak value and a predetermined length of the early range, wherein the length of the early range is the number of the sampling points in the early range; and
   a symbol boundary determining circuit to determine a symbol boundary reference point according to the threshold and the early range.

5. The device according to claim 4, wherein the observation window circuit sequentially determines the values of every N successive sampling signals of the first estimated signal and then derives the maximum peak value according to the maximum value of the N successive sampling points.

6. The device according to claim 4, wherein the observation window circuit sequentially determines the values of a first sampling point set including N successive sampling signals of the first estimated signal and the values of a second sampling point set including the next N successive sampling signals of the first estimated signal, then respectively calculates a plurality of average values by averaging the values of the corresponding sampling points of at least the first and the second sampling point sets, and selects the maximum value of the average values to be the maximum peak value.

7. The device according to claim 4, wherein the threshold is determined by multiplying the maximum peak value with the weighting coefficient having a value set in advance.

8. The device according to claim 7, wherein the weighting coefficient represents the characteristic of the multi-channel communication system.

9. The device according to claim 4, wherein the position of the sampling point corresponds to the maximum peak value is the end point of the early range.

10. The device according to claim 4, wherein the symbol boundary determining circuit is to determine the sampling point which is nearest to the start point of the early range and the value of the sampling point is greater than the threshold in the early range to be the symbol boundary reference point.

11. The device according to claim 1, wherein the second preamble includes a guard interval in the head of the second preamble and the detection unit generates the detection signal when detecting the receiving of the guard interval of the second preamble.

12. The device according to claim 11, wherein the detection unit further comprises:
   a sliding delay correlator for performing a correlation operation according to at least a first sampling intervals including a plurality of the signals and a second sampling intervals adjacent to the first sampling intervals which includes a plurality of the signals of the second preamble and outputting a correlated signal;

a power detector for detecting the power level of the receiving second preamble and determining a power threshold according to the detected power level; and a first comparator, which is coupled to the sliding delay correlator and the power detector for outputting the detection signal by comparing the correlated signal to a power threshold.

13. The device according to claim 12, wherein the signals of the first and the second sampling intervals are sliding updated when the new signals of the second preamble are received sequentially.

14. The device according to claim 11, wherein the detection unit comprises:

a second preamble matched filter for outputting a second estimated signal corresponds to the CIR of the multi-channel communication system according to the second preamble; and a second comparator, which is coupled to the boundary detector, the second preamble matched filter, and the timing controller, for determining the detection signal according to the first estimated signal and the second estimated signal.

15. The device according to claim 1, wherein the at least one symbol further includes a guard interval in the head of the at least one symbol and the device further comprises a guard interval removing unit for removing the guard interval of the at least one symbol according to the output of the timing controller.

16. The device according to claim 1, wherein the multi-channel communication system is an OFDM (orthogonal frequency division multiplexing) communication system.

17. The device according to claim 16, wherein the multi-channel communication system is an IEEE 802.11a or IEEE 802.11g WLAN (wireless local area network) communication system.

18. The device according to claim 17, wherein the first preamble is a short preamble and the second preamble is a long preamble.

19. A symbol boundary detection method for use in a receiver of a multi-channel communication system, wherein the receiver receives a packet having a plurality of signals which are divided into a first preamble, a second preamble and at least one symbol, the symbol boundary detection method comprising the steps of:

outputting a first estimated signal corresponding to a CIR (channel impulse response) of the multi-channel communication system according to the first preamble;

determining a symbol boundary reference point according to the first estimated signal;

outputting a detection signal when detecting the receiving of the second preamble; and determining a start point of the at least one symbol according to the symbol boundary reference point and the detection signal.

20. The method according to claim 19, wherein the first estimated signal is generated according to the auto-correlation property of the first preamble.

21. The method according to claim 19, wherein the first estimated signal comprises a plurality of sampling points.

22. The method according to claim 21, wherein the step of determining the symbol boundary reference point further comprises the steps of:

determining a maximum peak value of the first estimated signal according to the sampling points;

determining a threshold according to a maximum peak value and a weighting coefficient;

determining the early range according to the position of the sampling point corresponds to the maximum peak value and a predetermined length of the early range, wherein the length of the early range is the number of the sampling points in the early range; and determining a symbol boundary reference point according to the threshold and the early range.

23. The method according to claim 22, wherein the step of determining a maximum peak value further comprises the steps of:

sequentially determining the values of every N successive sampling signals of the first estimated signal; and deriving the maximum peak value according to the maximum value of the N successive sampling points.

24. The method according to claim 22, wherein the step of determining a maximum peak value further comprises the steps of:

sequentially determining the values of a first sampling point set including N successive sampling signals of the first estimated signal and the values of a second sampling point set including the next N successive sampling signals of the first estimated signal;

respectively calculating a plurality of average values by averaging the values of the corresponding sampling points of at least the first and the second sampling point sets; and selecting the maximum value of the average values to be the maximum peak value.

25. The method according to claim 22, wherein the threshold is determined by multiplying the maximum peak value with the weighting coefficient having a value set in advance, wherein the weighting coefficient represents the characteristic of the multi-channel communication system.

26. The method according to claim 22, wherein the position of the sampling point corresponds to the maximum peak value is the end point of the early range.

27. The method according to claim 22, wherein the symbol boundary reference point is determined to be the sampling point which is nearest to the start point of the early range and the value of the sampling point is greater than the threshold in the early range to be.

28. The method according to claim 19, wherein the second preamble includes a guard interval in the head of the second preamble and the detection signal is generated when detecting the receiving of the guard interval of the second preamble.

29. The method according to claim 28, wherein the step of generating the detection signal further comprises the steps of:

performing a correlation operation according to at least a first sampling intervals including a plurality of the signals and a second sampling intervals adjacent to the first sampling intervals which includes a plurality of the signals of the second preamble and outputting a correlated signal;

detecting the power level of the receiving second preamble and determining a power threshold according to the detected power level; and outputting the detection signal by comparing the correlated signal to a power threshold.

30. The method according to claim 29, wherein the signals of the first and the second sampling intervals are sliding updated when the new signals of the second preamble are received sequentially.

31. The method according to claim 28, wherein the step of generating the detection signal further comprises the steps of:

outputting a second estimated signal corresponds to the CIR of the multi-channel communication system according to the second preamble; and determining the detection signal according to the first estimated signal and the second estimated signal.

32. The method according to claim 19, wherein the at least one symbol further includes a guard interval in the head of the at least one symbol and the method further comprises the step of removing the guard interval of the at least one symbol according to the output of the timing controller.

33. The method according to claim 19, wherein the multi-channel communication system is an OFDM (orthogonal frequency division multiplexing) communication system.

34. The method according to claim 19, wherein the multi-channel communication system is an IEEE 802.11a or IEEE 802.11g WLAN (wireless local area network) communication system.

35. The method according to claim 19, wherein the first preamble is a short preamble and the second preamble is a long preamble.

* * * * *